United States Patent [19]

Drentea

[11] Patent Number: 4,584,716
[45] Date of Patent: Apr. 22, 1986

[54] AUTOMATIC DUAL DIVERSITY RECEIVER

[75] Inventor: Cornell Drentea, Minneapolis, Minn.

[73] Assignee: Honeywell Inc., Minneapolis, Minn.

[21] Appl. No.: 670,100

[22] Filed: Nov. 13, 1984

[51] Int. Cl.⁴ .............................................. H04B 1/26
[52] U.S. Cl. .................................... 455/318; 455/52; 455/141; 455/323
[58] Field of Search ................. 455/52, 141, 313, 318, 455/323, 296, 297, 133, 135, 137; 375/40, 100

[56] References Cited

U.S. PATENT DOCUMENTS

| 3,540,055 | 10/1967 | Takagi | 455/141 |
| 4,223,405 | 9/1980 | Hattori et al. | 455/52 |
| 4,539,710 | 9/1985 | Dinsmore | 455/134 |

Primary Examiner—Jin F. Ng
Assistant Examiner—Elissa Seidenglanz
Attorney, Agent, or Firm—Stephen W. Buckingham

[57] ABSTRACT

A radio receiver capable of receiving signals on at least two different frequencies at the same time is described. A hetrodyne frequency is selected midway between the frequencies and an intermediate frequency is selected at a frequency equal to one half of the difference of the frequencies to be received.

5 Claims, 3 Drawing Figures

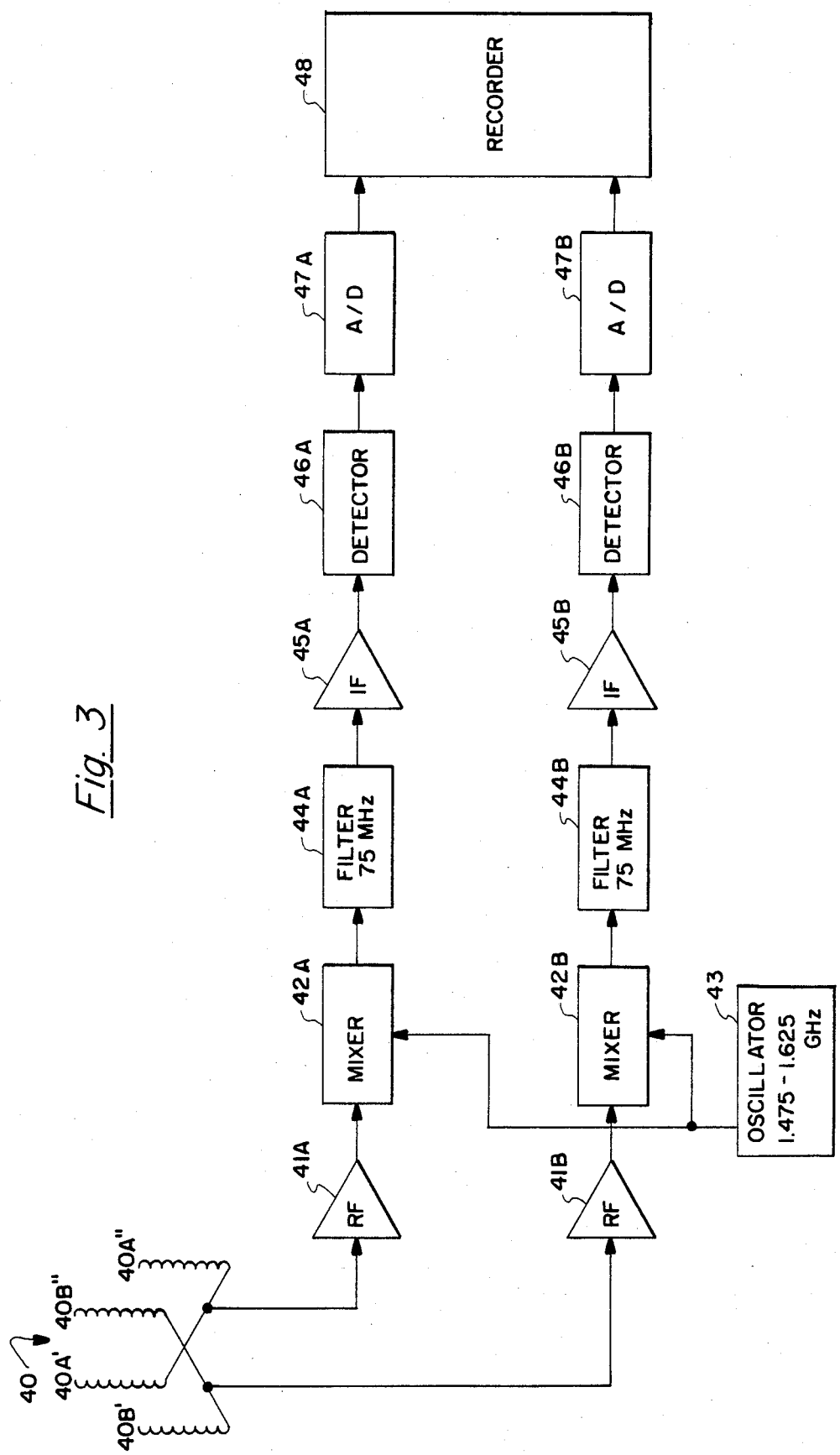

AUTOMATIC DUAL DIVERSITY RECEIVER

The present invention relates to radio receivers and more particularly to radio receivers capable of receiving more than one frequency at a time.

BACKGROUND OF THE INVENTION

In some situations a particular signal to be broadcast by radio is broadcast at two or more different frequencies. This provides an advantage when weather conditions prevent good reception on one of the frequencies. For example, the National Bureau of Standards broadcasts its time signals at 5 MHz, 10 MHz, 15 MHz, and 20 MHz. If one of these frequencies is blocked by weather conditions or other problems, the radio receiver is simply retuned to a frequency that is not blocked. In critical situations, however, important information may be lost during the retuning process if the receiver is tuned to a frequency which is blocked when that information is transmitted. Therefore, in such situations, a plurality of frequency diversity receivers, one for each frequency, must be employed. However, a single radio receiver which could receive more than one frequency would be more advantageous.

SUMMARY OF THE INVENTION

The present invention allows a single radio receiver to receive at least two preselected frequencies by selecting a heterodyne frequency midway between those two frequencies and an intermediate frequency equal to one half of the difference of the two selected frequencies.

BRIEF DESCRIPTION OF THE DRAWINGS

FIG. 3 is a block diagram of an embodiment of the invention intended for use in a specific application.

DETAILED DESCRIPTION OF THE PREFERRED EMBODIMENT

Figure 1:
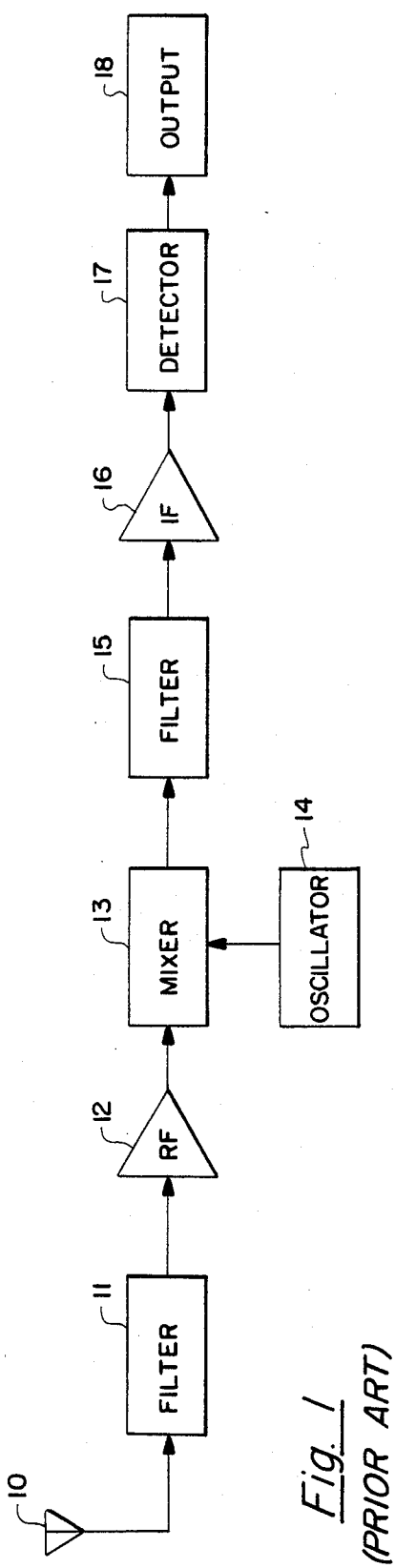
FIG. 1 is a block diagram of a prior art radio receiver.

FIG. 1 shows a block diagram of a typical prior art radio receiver. Electromagnetic waves produce an electrical current in antenna 10 which is connected to filter 11. Filter 11 removes signals at frequencies other than the particular frequency which is desired to be detected. Signals of the selected frequency are passed to radio frequency amplifier 12 and then to mixer 13. Mixer 13 combines the amplified and filtered signal with a second signal from oscillator 14. As a result, mixer 13 provides as an output the two signals which have been provided to it as inputs as well as signals at frequencies equal to the sum and difference of the frequencies of the two input signals. Filter 15 removes the radio frequency signal which was provided by radio frequency amplifier 12 to mixer 13, the signal which is provided to mixer 13 from oscillator 14, and the signal at the sum of the frequencies. Therefore, filter 15 passes only the signal at the difference of the frequencies to intermediate frequency amplifier 16. This signal is amplified and passed to detector 17 and finally to output stage 18. Output stage 18 would typically be an audio frequency amplifier and a loudspeaker, although other devices such as radio controlled guidance systems could also be used.

If the radio receiver of FIG. 1 was to be used to receive signals on the 5 MHz WWV channel and the intermediate frequency was chosen to be 1 MHz, oscillator 14 would be chosen to operate at either 4 or 6 MHz, typically 6 MHz. This would produce the desired difference frequency of 1 MHz. If oscillator 14 is chosen to operate at 6 MHz, any signals entering mixer 13 at a frequency of 7 MHz would also produce a difference signal at 1 MHz. Therefore, those signals must be removed by filter 11 in order that only the signals at 5 MHz are converted to the 1 MHz intermediate frequency and transmitted to detector 17. This phenomenon is known as the "image" problem and is a major deficiency of a superheterodyne processing system. The design of a filter, such as filter 11, has been very important in the construction of radio receivers.

Figure 2:
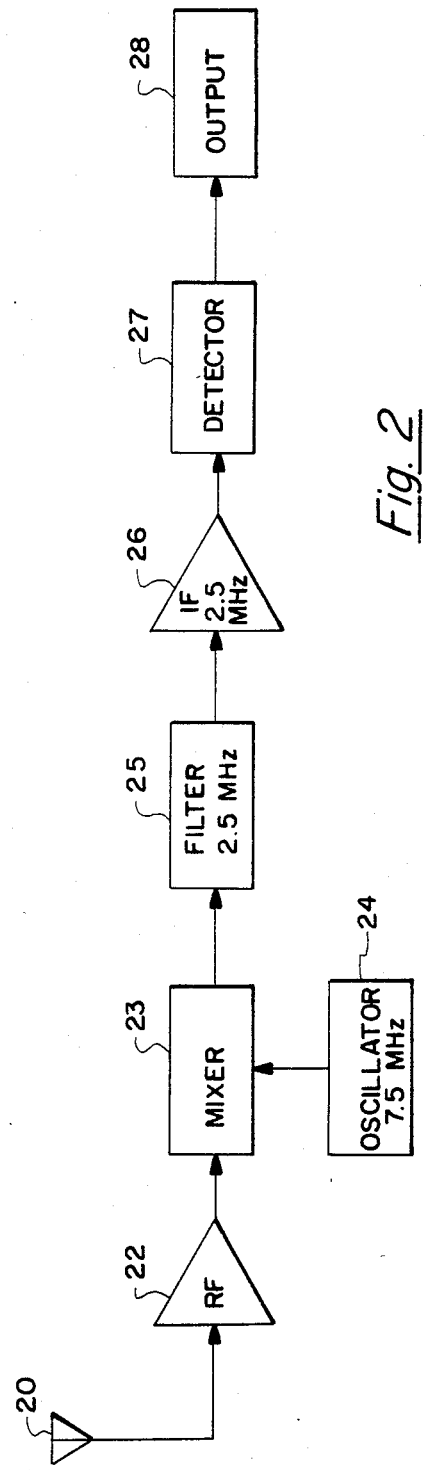
FIG. 2 is a block diagram of a preferred embodiment of the invention.

The present invention avoids the problem of designing a filter, such as filter 11 of FIG. 1, by actually using the fact that two different frequencies will be translated to the same intermediate frequency. FIG. 2 shows a preferred embodiment of the present invention. The invention will be described for a system for receiving the 5 and 10 MHz WWV channels, although those skilled in the art will readily perceive that the invention could be used at other frequencies.

In the system of FIG. 2 a radio signal is received by antenna 20 and transmitted to radio frequency amplifier 22. Radio frequency amplifier 22 passes the amplified signal to mixer 23 which mixes the received signal with the output of oscillator 24. Oscillator 24 produces a signal which has a frequency of 7.5 MHz. The output of mixer 23 is passed to filter 25. Filter 25 is a band pass filter which passes signals in a band centered at 2.5 MHz and blocks signals at all other frequencies. These 2.5 MHz signals are passed to IF amplifier 26 and from there to detector 27 and output 28. Because the oscillator operates at 7.5 MHz, information contained in the original received signal at 5 MHz and at 10 MHz will both appear at 2.5 MHz at filter 25. Therefore, the information at both 5 and 10 MHz will be passed through to detector 27 and output stage 28.

Those skilled in the art will readily perceive that the invention is not limited to the frequencies used in the example of FIG. 2. The invention may be used with any two frequencies as long as oscillator 24 is selected to operate at a frequency midway between those two frequencies and the intermediate frequency is chosen to be equal to one half of the difference of the two frequencies of interest.

FIG. 3 shows another embodiment of the invention for use in a system designed to scan a range of frequencies for a signal. Particularly, the system of FIG. 3 might be used in scanning for signals transmitted by an extra terrestrial intelligence.

For reasons which go beyond the scope of the present discussion, researchers working in such a search believe that such signals would most likely be in the form of polarization modulated digital signals in the range of 1.4 to 1.7 GHz. In order to search for such signals, a radio telescope must be directed in a particular direction and then must sweep through the entire frequency range of interest while monitoring for polarization and coded signals. If no such signals are detected, the radio telescope must be redirected and the process repeated. Because the present invention allows two frequencies to be received at the same time, the amount of time required for such monitoring is cut in half.

Turning now to FIG. 3, an antenna structure 40 includes individual electrical elements 40A', 40A", 40B', and 40B". Electrical elements 40A' and 40A" are designed to receive signals having a particular circular polarization, for example, clockwise polarization. Electrical elements 40B' and 40B" are designed to receive signals having the other circular polarization, in this example, counter clockwise polarization. Electrical elements 40A' and 40A" are electrically connected to radio frequency amplifier 41A, while electrical elements 40B' and 40B" are electrically connected to radio frequency amplifier 41B.

Because the signals received by antenna elements 40A' and 40A" and those received by antenna elements 40B' and 40B" are processed by similar processing systems only The system which is connected to antenna element 40A' and 40A" will be described. Those skilled in the art will perceive that a similar system is utilized to process the signals received by electrical elements 40B' and 40B". After amplification by radio frequency amplifier 41A, the signal is passed to mixer 42A which mixes the signal received by electrical elements 40A' and 40A" with the output of oscillator 43. Oscillator 43 is designed to operate in the range of 1.475 to 1.625 GHz. When the oscillator operates at 1.475 GHz, the incoming signals to the mixer having frequencies of 1.4 GHz and 1.55 GHz will each produce an output signal from the mixer having a frequency of 75 MHz. As the frequency of oscillator 43 is increased, signals at two frequencies within the range 1.4 to 1.7 GHz will continue to produce components at 75 MHz in the output of mixer 42A. When the frequency of the oscillator reaches 1.625 GHz signals at frequencies of 1.55 GHz and 1.7 GHz will produce components at 75 MHz. The output of mixer 42A is passed to filter 44A which is a band pass filter set for 75 MHz. This frequency is chosen as the intermediate frequency. The 75 MHz signal is passed from filter 44A to intermediate frequency amplifier 45A. From there the signal is passed to detector 46A and to analog to digital converter 47A. The output from analog to digital converter 47A is passed to recorder 48 for later analysis. In this manner the entire frequency range of interest may be scanned in half the time which would be required using prior art receiver.

The embodiments of the invention in which an exclusive property or right is claimed are defined as follows:

1. Apparatus for receiving a first radio signal at a first frequency and a second radio signal at a second frequency contemporaneously, said first and second frequencies being separated by a first frequency difference, said apparatus comprising:

oscillator means having an output means, said oscillator means being adapted to provide an oscillator signal at a frequency equal to one half of the sum of said first and second frequencies at said oscillator output means;

mixer means having radio signal input means, oscillator signal input means, and output means, said mixer means radio signal input means being adapted to accept said first and second radio signals at said mixer means radio signal input means and said mixer means oscillator signal input means being electrically connected to said oscillator means output means, said mixer means being adapted to mix said first and second radio signals with said oscillator signal to form a mixed signal and to provide said mixed signal at said mixer means output means; and filter means having an input means and an output means, said filter mean input means being electrically connected to said mixer means output means, said filter means being capable of passing signals having a frequency equal to one half of said first frequency difference and being capable of providing a filtered signal at said filter means output means.

2. Apparatus of claim 1 further comprising a detector means to detect information encoded in said filtered signal.

3. Apparatus of claim 2 further comprising intermediate frequency amplifier means capable of amplifying signals at a frequency equal to one half of said first frequency difference, said intermediate frequency amplifier means operating on said filtered signal before said signal is provided to said detector means.

4. Apparatus of claim 3 further comprising a radio frequency amplifier means for amplifying said first and second radio signals before said signals are provided to said mixer means.

5. Apparatus of claim 1 further comprising a radio frequency amplifier capable of amplifying signals at said first and second frequencies for amplifying said first and second radio signals before said signals are provided to said mixer.

* * * * *